US005561578A

United States Patent [19]

Shimoyanagida

[11] Patent Number: 5,561,578

[45] Date of Patent: Oct. 1, 1996

[54] X-RAY PROTECTOR

[75] Inventor: Susumu Shimoyanagida, Kyoto-fu, Japan

[73] Assignee: Mitsubishi Denki Kabushiki Kaisha, Tokyo, Japan

[21] Appl. No.: 237,557

[22] Filed: May 3, 1994

[30] Foreign Application Priority Data

May 7, 1993 [JP] Japan .................................... 5-106755

[51] Int. Cl.[6] ........................................................ H02H 3/20

[52] U.S. Cl. .............................. 361/91; 361/56; 324/522; 324/404

[58] Field of Search .................................. 361/78, 86, 88, 361/91, 54, 56; 324/103 R, 103 P, 115, 404, 409, 410, 522, 523, 527, 606, 609; 378/91, 118; 340/661, 662

[56] References Cited

U.S. PATENT DOCUMENTS 4,601,051 7/1986 Santurtun et al. ...................... 378/118

4,809,125 2/1989 Matsko et al. ........................... 361/93

*Primary Examiner*—Jeffrey A. Gaffin
*Assistant Examiner*—Ronald W. Leja

[57] ABSTRACT

The invention tests the operation of a CRT X-ray protector circuit without applying an abnormally high voltage to the CRT. In addition to a first reference voltage corresponding to the detected voltage which is the standard for the operation of the X-ray protector for use in a display device with the CRT, a second reference voltage set at a value lower than the first reference voltage and higher than 0 V is provided to enable the operation of the X-ray protector circuit by comparing the detected voltage with the second reference voltage at the time of testing the X-ray protector circuit's operation. A third reference voltage, higher than the first reference voltage, is compared to the detected voltage during channel switching or external input switching to prevent erroneous activation of the x-ray protector.

31 Claims, 5 Drawing Sheets

X-RAY PROTECTOR

BACKGROUND OF THE INVENTION

1. Field of the Invention

The present invention relates to an X-ray protector for use in display devices which incorporate a cathode ray tube (abbreviated as CRT hereinafter), which prevents the leakage of X-rays by stopping the generation of a DC high voltage to be applied to the CRT when the high voltage jumps to an abnormal level for some reason or other.

2. Description of the Prior Art

FIG. 5 is a block diagram of a prior art X-ray protector. In the figure, reference numeral 1 represents a power source, la an AC socket constituting the input terminal of the power source 1, 2 a high-voltage generator, 3 a CRT, and 4 a high-voltage detector which comprises resistors 5, 6 connected in series. This high-voltage detector 4 detects a voltage which is proportional to a high voltage applied to the CRT 3 from the the high-voltage generator 2. A voltage value detected by this high-voltage detector 4 should be 3.5 V, for example, at the time of normal operation when the high voltage applied from the high-voltage generator 2 to the CRT 3 is a normal value. Numeral 7 represents a first reference voltage. The first reference voltage 7 is set at a value whereby the high voltage applied from the high-voltage generator 2 to the CRT 3 becomes higher than the voltage at the normal operation and the amount of X-ray leaked from the CRT 3 becomes 0.5 R/H, e.g., 4.0 V. Numeral 8 represents a comparator whose output level is inverted when the detected voltage value exceeds the reference voltage value 7. Numeral 9 represents a latch which outputs the same inverted output as that of the comparator 8 to the power source 1 when it receives an inverted output from the comparator 8 and retains this state even after the output of the comparator 8 is no longer an inverted output. When the inverted output from the latch 9 is input into the power source 1, the power source 1 cuts off power supply therefrom to the high-voltage generator 2. As the result, the voltage applied from the high-voltage generator 2 to the CRT 3 becomes 0 V and the generation of X-rays is stopped. Numeral 10 represents a voltage regulator. This voltage regulator 10 is used to test the operation of the X-ray protector and is coupled to the power source 1 to control the power source 1 to generate an abnormally high voltage higher than the first reference voltage 7 to be applied from the high-voltage generator 2 to the CRT 3 when the operation of the X-ray protector is tested.

The X-ray protector has a function to cut off an abnormally high voltage to be applied to the CRT 3 in order to prevent the leakage of X-rays. As for color TV receivers, the operation of an X-ray protector must be tested as one of product tests to be conducted in the course of production from assembly of the CRT 3, the X-ray protector and other necessary circuit elements, to the time of shipping. In the prior art X-ray protector shown in FIG. 5, the voltage regulator 10 is connected to the power source 1, the AC socket l*a* of the power source 1 is inserted into the plug of an indoor power system installed at a test place, the voltage regulator 10 is used to raise the voltage supplied from the power source 1 to the high-voltage generator 2 so that an abnormally high voltage higher than the first reference voltage 7 is applied from the high-voltage generator 2 to the CRT 3, whereby the comparator 8 and the latch 9 are activated to cut off power supply from the power source 1 to the high-voltage generator 2 for testing the operation of the X-ray protector. Products whose the X-ray protectors operate properly are shipped as satisfactory and products whose X-ray protectors fail to operate properly are not shipped as defective.

Since an abnormally high voltage is applied to the CRT 3 at the time of testing the operation of the X-ray protector, the prior art X-ray protector involves the problems that the abnormally high voltage may damage the CRT and that the amount of X-ray leakage increases at the time of testing.

In a display device such as a TV receiver which incorporates such a prior art X-ray protector, an abnormally high voltage higher than the first reference voltage 7 is supplied from the high-voltage generator 2 to the CRT 3 at the time of channel switching. The high-voltage detector 4 detects this abnormally high voltage, but the detected voltage to be supplied from this high-voltage detector 4 to the comparator 8 is absorbed by a capacitor having a large capacity, not shown in FIG. 5, so that the X-ray protector does not malfunction at the time of channel switching. However, there is another problem that the operation of the X-ray protector is delayed due to a time constant caused by the large capacity of the above-described capacitor.

SUMMARY OF THE INVENTION

An object of the invention is to enable the operation test of the X-ray protector for use in a display device incorporating a CRT to be carried out at a voltage value which is lower than the reference voltage value before shipping the X-ray protector and the CRT for the prevention of the X-ray leakage of the X-ray protector at the time of the normal use of the display device, without the hindrance of normal use conditions after sale of the display device.

Another object of the invention is to prevent the malfunction of the X-ray protector at the time of channel switching or switching to or from external inputs.

A further object of the invention is to enable a microcomputer to test the operation of the X-ray protector.

The X-ray protector according to the present invention uses the second reference voltage which is set at a value lower than the first reference voltage, which is a criterion for judging the actual operation of the X-ray protector, and higher than 0 V to test the operation thereof.

The X-ray protector according to the present invention is provided with switching means for comparing the detected voltage with a third reference voltage which is set at a value higher than the first reference voltage when the voltage is elevated by channel switching or other causes.

Furthermore, the detected voltage value is converted into digital data and the microcomputer is used to compare the digital data with data corresponding to the first or second reference voltage so as to enable the actual operation and test operation of the X-ray protector.

According to the present invention, since the X-ray protector is activated at a normal voltage by comparing the detected voltage value with the second reference voltage value at the time of testing the X-ray protector's operation, an operation test can be conducted on the X-ray protector which is in a normal condition. In addition, the X-ray protector can be prevented from being operated by channel switching or other causes since the reference voltage value is switched to the third reference voltage value at the time of channel switching or other causes.

Moreover, since the detected voltage value is converted into digital data and compared with the first or second reference voltage data by the microcomputer so as to test the operation of the X-ray protector, this operation test can be performed by a remote controller.

Further scope of applicability of the present invention will become apparent from the detailed description given hereinafer. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustrated only, and thus are not limitative of the present invention, and wherein.

DETAILED DESCRIPTION OF THE INVENTION

Embodiment 1

Figure 1:
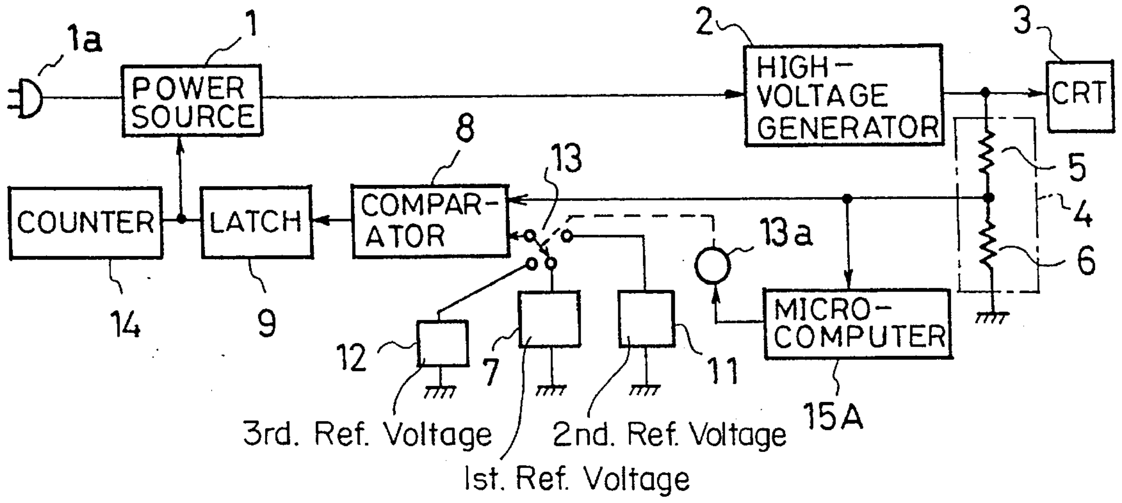
FIG. 1 is a block diagram of an X-ray protector according to Embodiment 1 of the present invention.
Figure 5:
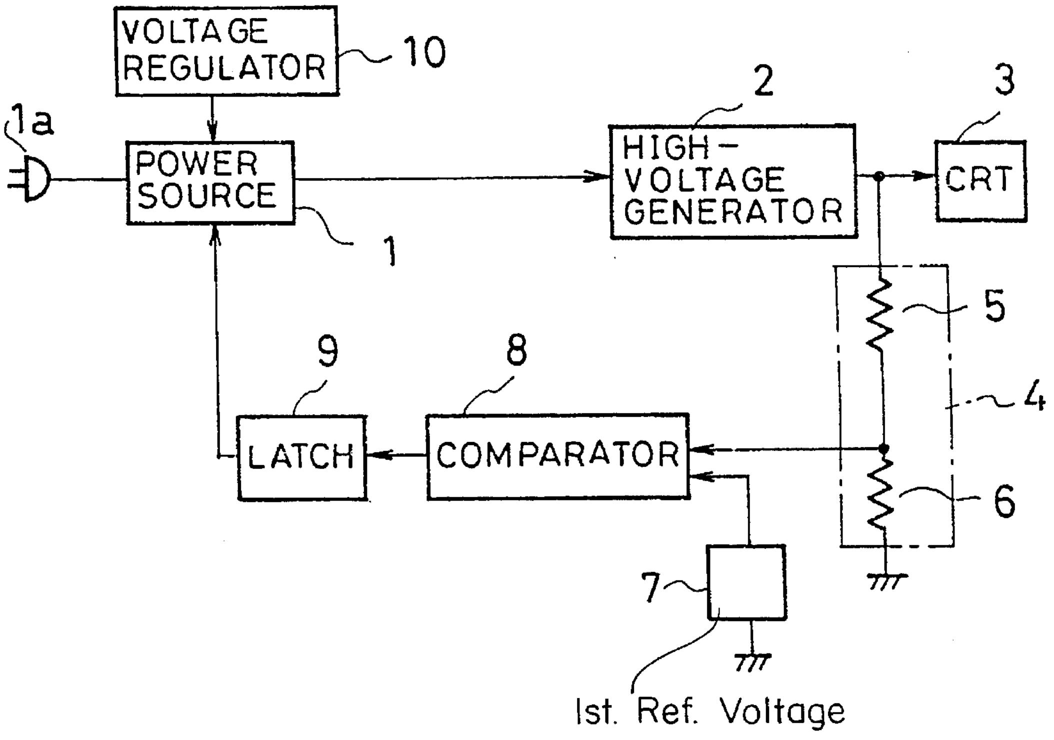
FIG. 5 PRIOR ART
FIG. 5 is a block circuit diagram of a prior art X-ray protector.

FIG. 1 is a block circuit diagram of an X-ray protector according to Embodiment 1 of the present invention. The same reference numbers as those of FIG. 5 represent the same or corresponding parts.

In FIG. 1, when the power source 1 is turned on while the AC socket 1*a* is inserted into the plug of the unshown indoor power system, it supplies voltage to the high-voltage generator 2. The high-voltage generator 2 generates a high voltage based on the voltage supplied from the power source 1 and supplies it to the CRT 3. The high voltage supplied from the high-voltage generator 2 to the CRT 3 is detected by the high-voltage detector 4 which comprises resistors 5, 6 connected in series. This high-voltage detector 4 applies the detected voltage value which is proportional to the high voltage supplied from the high-voltage generator 2 to the CRT 3 to a comparison value terminal which is one input terminal of the comparator 8, and a microcomputer 15A.

A switch 13 which comprises three fixed contacts and one movable contact is connected to a reference value terminal which is the other input terminal of the comparator 8. In concrete terms, the movable contact of the switch 13 is connected to the reference value terminal of the comparator 8. A first reference voltage 7, a second reference voltage 11, and a third reference voltage 12, all set by an unshown reference voltage setting unit, are supplied to the respective fixed contacts of the switch 13.

The first reference voltage 7 is set at a value whereby the amount of X-ray leakage from the CRT 3 becomes 0.5 R/H, e.g., 4.0 V. This first reference voltage is higher than the voltage applied from the high-voltage generator 2 to the CRT 3, e.g., 3.5 V, at the time of normal operation. The second reference voltage 11 is set at a value lower than 3.5 V and higher than 0 V, e.g., 1 V. The third reference voltage 12 is set at a value higher than an elevated value caused by channel switching or switching to or from inputs from video terminals, e.g., 5 V.

The movable contact of the switch 13 has an actuator 13*a* which switches contacts according to the output of the microcomputer 15A. In concrete terms, the microcomputer 15A activates the actuator 13*a* to connect the movable contact of the switch 13 to (1) the fixed contact supplied with the first reference voltage 7 when an instruction for normal use is input, to (2) the fixed contact supplied with the second reference voltage 11 when an instruction for testing the operation of the X-ray protector is input, and to (3) the fixed contact supplied with the third reference voltage 12 before channel switching or switching to or from inputs from video terminals, when an instruction for channel switching or switching to or from inputs from video terminals is input.

As the result, the switch 13 selects one from among the first, second and third reference voltages 7, 11, 12 as a reference voltage to be supplied to the reference value terminal of the comparator 8. The comparator 8 compares the detected voltage value applied to the comparison value terminal thereof with one of the first, second and third reference voltage values 7, 11, 12 applied to the reference value terminal thereof, and outputs an inverted output to the latch 9 when the detected voltage value exceeds the reference voltage value.

When the latch 9 receives the inverted output from the comparator 8, it outputs the same inverted output as that from the comparator 8 to the power source 1 and retains this state even after the output of the comparator 8 is no longer an inverted output.

When the inverted output from the latch 9 is applied to the power source 1, the power source 1 cuts off power supply therefrom to the high-voltage generator 2.

Reference numeral 14 represents a counter for counting the number of inverted outputs from the latch 9, that is, the number of operations of the X-ray protector. This count value is stored in an unshown memory provided for the counter 14. A mechanical or electronic counter can be used as the counter 14o In the case of a mechanical counter, the memory of the counter functions as a counter display board, whereas, in the case of an electronic counter, the memory is formed of a non-volatile memory.

A description is subsequently given of the operation of the X-ray protector. At the time of normal operation when an instruction for normal use is input into the microcomputer 15A, the switch 13 applies the first reference voltage 7 to the comparator 8 so that the X-ray protector operates in the same way as the prior art at the time of normal operation.

Next, at the time of testing the X-ray protector's operation when an instruction for test operation is input into the microcomputer 15A, the switch 13 applies the second reference voltage 11 to the comparator 8. Since the value of the second reference voltage 11 is lower than the detected voltage value obtained when the high voltage applied to the CRT 3 is a normal value, an inverted output is immediately output from the comparator 8 to the latch 9 which in turn retains the inverted output, cuts off power supply from the power source 1 to the high-voltage generator 2, and stops the generation of a high voltage. As a result, the X-ray protector has been operated properly in the operation test by the voltage lower than the detected voltage at the time of normal use. In this way, if the X-ray protector operates properly, power supply to the CRT 3 is cut off and the CRT 3 is turned off. Therefore, an operator easily knows that the X-ray protector has operated properly when a CRT, which has been operating thus far, turns off.

The reasons that the second reference voltage 11 is set at a value higher than 0 V are to stop the operation of the X-ray protector when the resistor 5 of the high-voltage detector 4 is disconnected or short-circuited, or when a connecting wire extending from the high-voltage detector 4 to the comparator 8 is broken, wherein the detected voltage to be applied from the high-voltage generator 4 to the comparator 8 becomes 0 V or another close to this value, and to compensate for such a circuit defect.

The counter 14 counts the number of operations of the X-ray protector in a display device such as a TV receiver and stores it into its memory. For this reason, it is easy to have a record of the number of the X-ray protector operations by displaying this count value on the CRT 3, thus preventing the omission of inspection in the course of production and facilitating trouble shooting at the time of after-sale service.

In a color TV receiver, the voltage applied to the CRT 3 jumps for a moment at the time of channel switching or switching to or from external inputs through the use of video terminals, for example. In this case, if the operator presets an instruction for channel switching or switching to or from external inputs into the microcomputer 15A before channel switching or switching to or from external inputs, the microcomputer 15A enables the switch 13 to perform a switching operation to select the third reference voltage 12 and apply it to the comparator 8, thus preventing the X-ray protector from being operated by channel switching or other causes.

Embodiment 2

Figure 2:
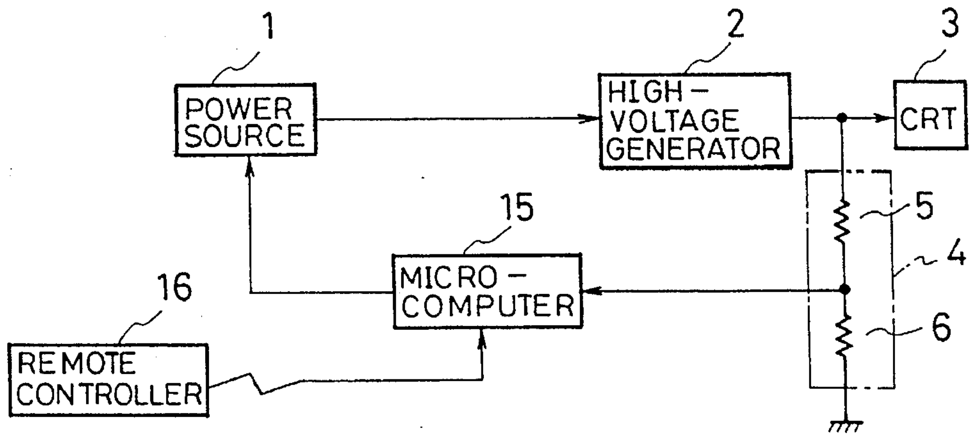
FIG. 2 is a block diagram of an X-ray protector according to Embodiment 2 of the present invention.

FIG. 2 is a block circuit diagram of an X-ray protector according to Embodiment 2 of the present invention in which the same reference codes as those of FIG. 1 represent the same or corresponding parts. Reference numeral 15 represents a microcomputer which converts the detected voltage into digital data and controls the operation of the X-ray protector. Reference numeral 16 represents a remote controller for instructing the microcomputer 15 to operate.

Figure 3A:
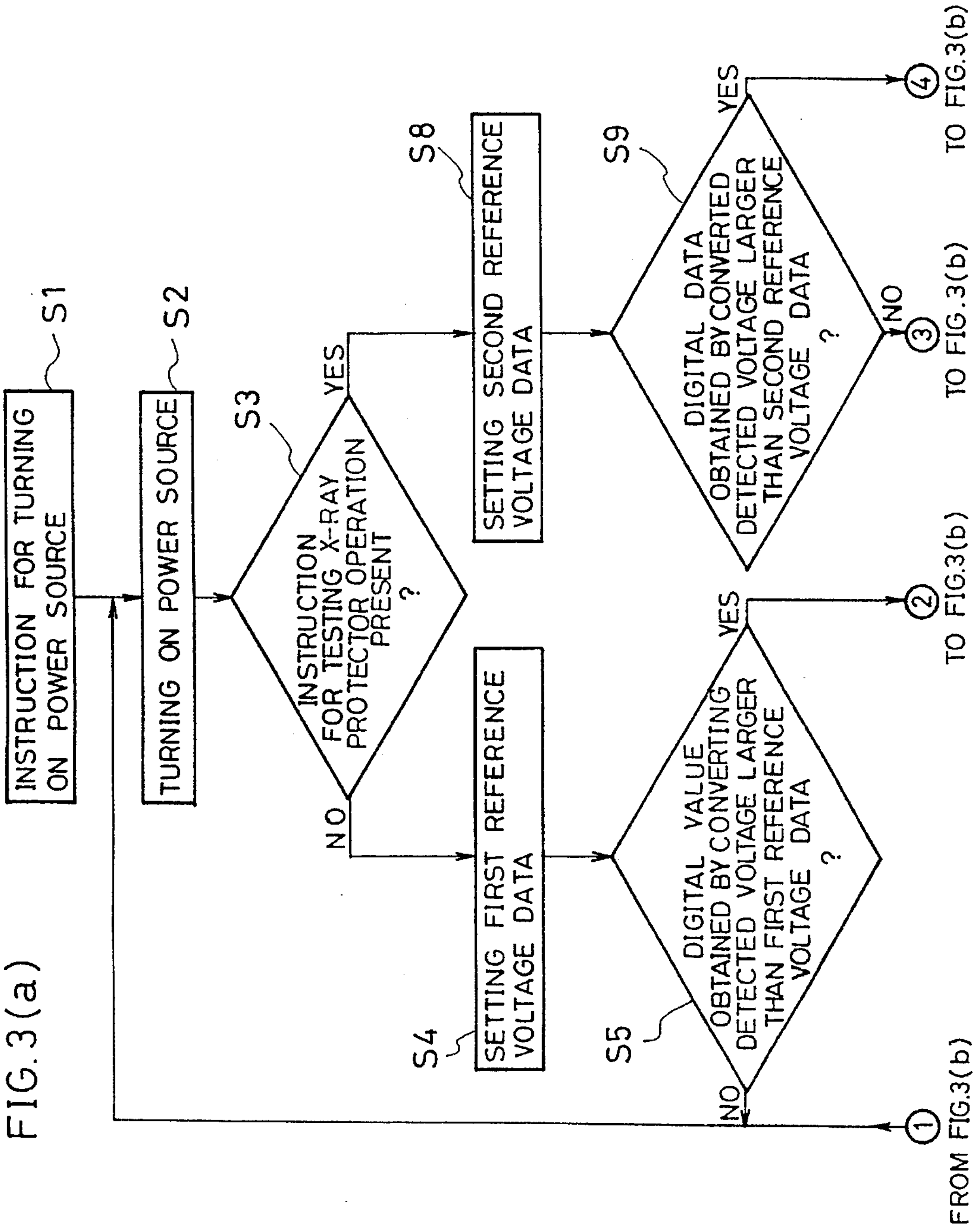
FIG. 3(*a*) and 3(*b*) illustrate a control flow chart of Embodiment 2.
Figure 3B:
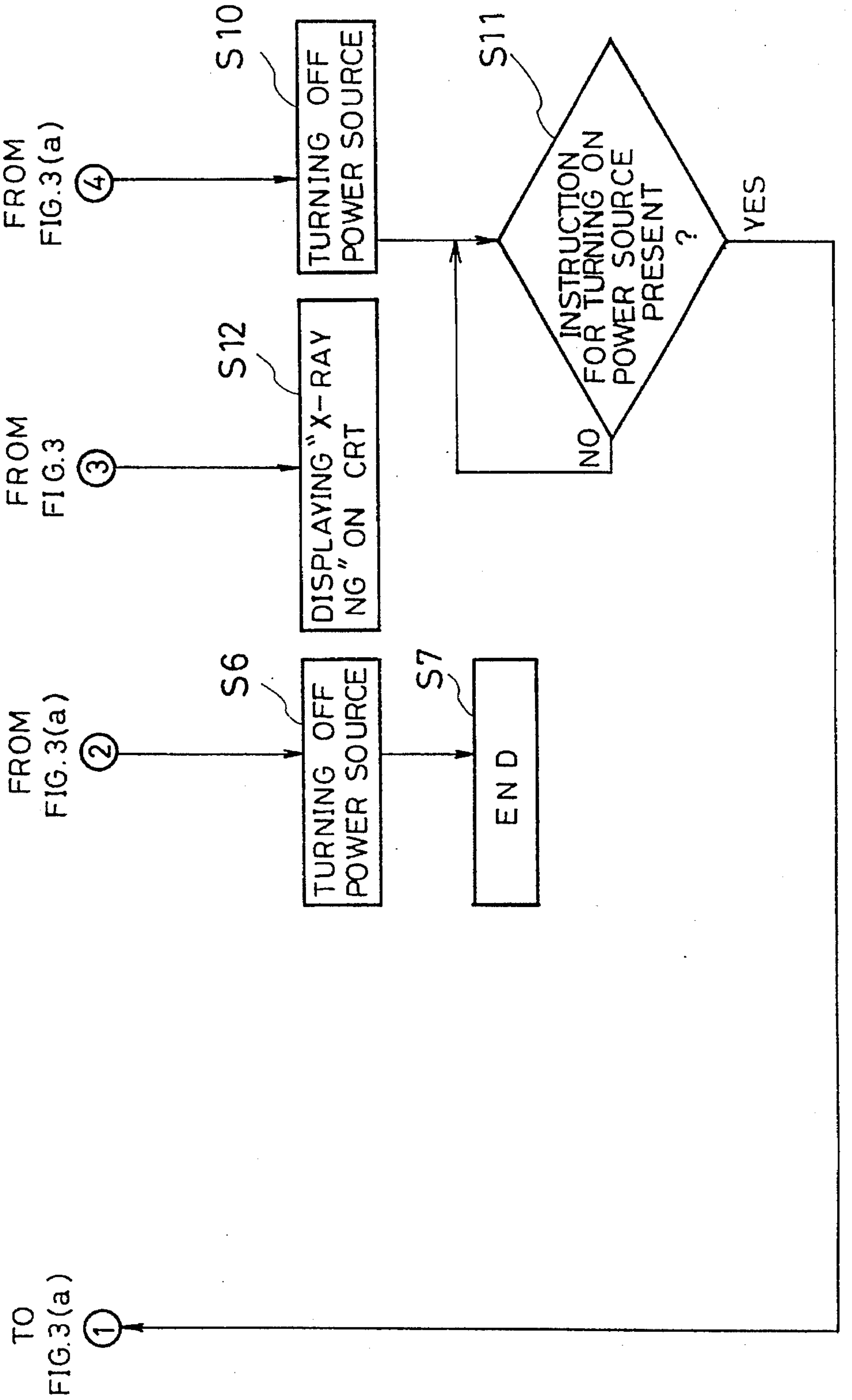

FIGS. 3(*a*) and 3(*b*) is a flow chart of the control operation of the microcomputer of Embodiment 2.

A description is subsequently given of the operation of Embodiment 2 with reference to FIGS. 2, 3(*a*) and 3(*b*). In step 1, the microcomputer 15 receives an instruction from the remote controller 16 to turn on the power source 1, and in step 2 the microcomputer 15 turns on the power source 1. In the subsequent step 3, the microcomputer 15 checks if an instruction for testing the operation of the X-ray protector is present or not. If it is absent, the microcomputer sets the reference voltage to be compared with the detected voltage data to data corresponding to the first reference voltage (referred to as "first reference voltage data" hereinafter) in step 4, compares the detected voltage data with the first reference voltage data in step 5, returns to step 2 if the detected voltage data is smaller than the first reference voltage data, goes to step 6 to turn off the power source 1 if the detected voltage data is larger, and ends the operation of the X-ray protector in step 7.

Meanwhile, if the instruction for testing the operation of the X-ray protector is present in step 3, the microcomputer advances to step 8 to set the second reference voltage data, and compares the second reference voltage data with the detected voltage data in step 9. If the detected voltage data is larger than the second reference voltage data, the microcomputer goes to step 10 to turn off the power source 1. Since "turning off the power source 1" in step 10 means that the X-ray protector has operated properly in the operation test, the microcomputer maintains this state in step 11 until an instruction for turning on the power source 1 is input from the remote controller 16 and returns to step 2 when it receives the instruction for turning on the power source 1.

On the other hand, if the detected voltage data is smaller than the second reference voltage in step 9, "X-RAY NG" or other codes indicating the presence of a circuit defect is displayed on the CRT screen.

Embodiment 3

Figure 4:
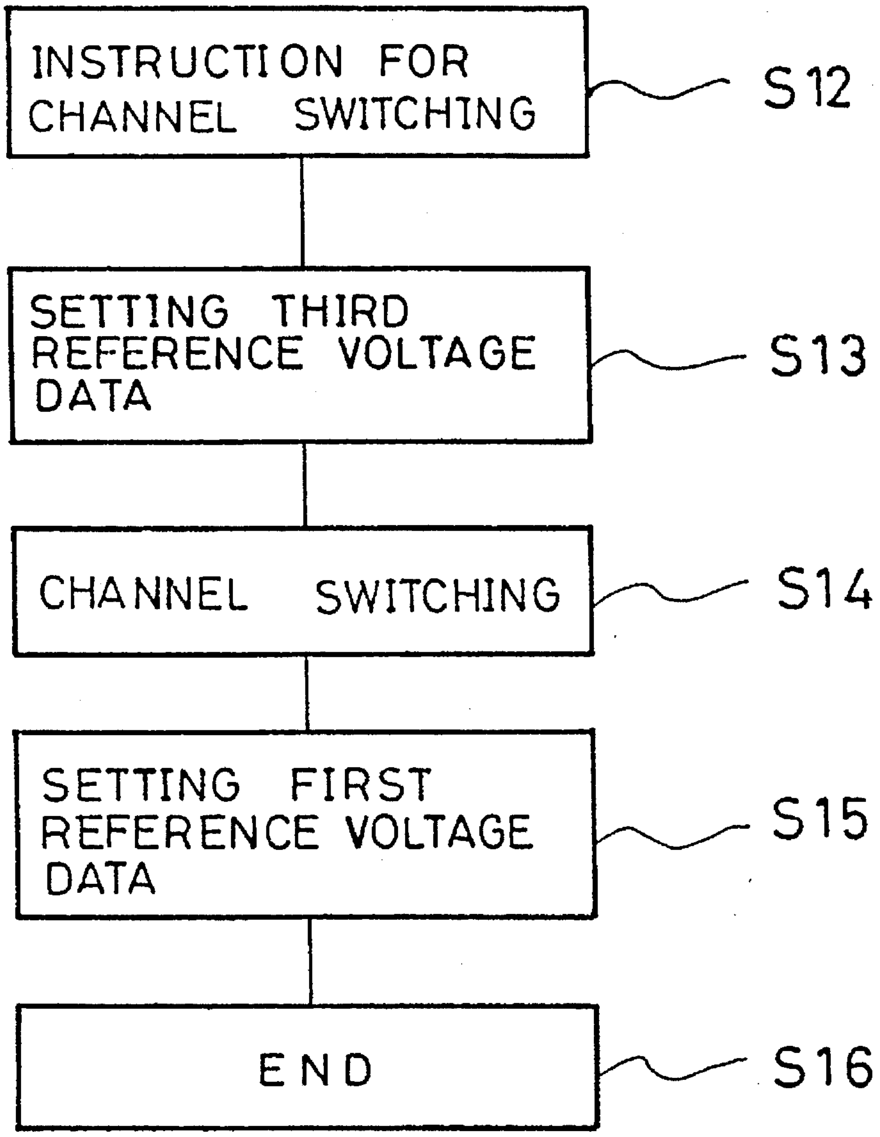
FIG. 4 is a control flow charge of Embodiment 3.

FIG. 4 is a flow chart of Embodiment 3 of the present invention. This Embodiment 3 is characterized by using a microcomputer having the afore-mentioned first reference voltage data, the afore-mentioned second reference voltage data, and third reference voltage data corresponding to the third reference voltage. Elements which appear in the block circuit diagram of the X-ray protector are given the same reference codes as those of FIG. 2.

In FIG. 4, in step 12, the microcomputer 15 receives an instruction for switching channels from the remote controller 16. The microcomputer 15 changes the reference voltage from the first reference voltage data to the third reference voltage data before the switching operation of channels in step 14. Thereby, at the time of channel switching, the X-ray protector hardly operates, that is, the malfunction of the X-ray protector can be prevented. After a predetermined time elapses after the channel switching operation, the microcomputer 15 returns the reference voltage to the first reference voltage data from the third reference voltage data so as to go back to an operation state at the time of normal use.

The aforementioned step 12 is a process for checking if the instruction for switching channels is present or not, and is inserted between steps 2 and 3 in the flow chart of FIG. 3. If the instruction for channel switching is present, the microcomputer goes to step 13, whereas if the instruction is absent, it goes to step 3 of FIG. 3. In this manner, a series of processings of the microcomputer 15 having the first, second and third reference voltage data can be performed.

In the above-described embodiments, the detected voltage which is proportional to the high voltage applied to the CRT is obtained by the high-voltage detector 4, but, in the case of a high-voltage generator having a fly-back transducer, a voltage obtained by rectifying for a fly-back time pulses having the same polarity as that of a high voltage coil and generated in a detection coil provided in the vicinity of the high-voltage coil may be used as the detected voltage.

When the detected voltage becomes substantially 0 V due to a defect in the high-voltage detector, an on-screen display circuit may be used to display predetermined alarm characters on the screen of the CRT 3, or a device such as an LED may be turned on so as to indicate the malfunction of the X-ray protector.

In Embodiment 1, a control mechanism using the remote controller is provided to perform the same remote operation as in Embodiment 2. In other words, this control mechanism includes means for returning the microcomputer to step 2 from step 11 in FIG. 3 of Embodiment 2.

As described on the foregoing pages, according to the present invention, since the second reference voltage to be compared with the detected voltage applied to the CRT at the time of testing the operation of the X-ray protector is set at a value lower than the first reference voltage, the operation of the X-ray protector can be tested without applying an abnormally high voltage to the CRT and increasing the amount of X-ray leakage.

Furthermore, since the third reference voltage which is higher than the first reference voltage is applied to the comparator at the time of channel switching or switching to or from external inputs, the X-ray protector can be prevented from being operated by channel switching or switching to or from external inputs.

Moreover, since the detected voltage value is converted into digital data and is compared with the first or second reference voltage data by the microcomputer for the control of the operation of the X-ray protector, the operation of the X-ray protector can be controlled by the remote controller, thus enhancing operability.

Furthermore, since the second reference voltage is set at a value higher than 0 V, a circuit defect in the X-ray protection, if present, can be detected.

Furthermore, since the X-ray protector is provided with means for storing the number of operations of the X-ray protector for use in a display device, a record of the display device can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An X-ray protector for detecting a high voltage generated by a high voltage generator and applied to a cathode ray tube and for stopping power supplied to the high-voltage generator when the detected high voltage exceeds a first reference voltage corresponding to a high voltage for generating more than a predetermined amount of X-ray, the X-ray protector comprising:

means for receiving the detected high voltage; and means for stopping power supplied to the high voltage generator during testing of the X-ray protector if the detected high voltage is lower than the first reference voltage and higher than 0 V.

2. The X-ray protector according to claim 1 which further comprises:

means for inhibiting stoppage of power supplied to the high voltage generator if a voltage higher than the detected high voltage is applied to the cathode ray tube at the time of channel switching or external input switching.

3. An X-ray protector for detecting a high voltage generated by a high voltage generator and applied to a cathode ray tube and for stopping power supplied to the high-voltage generator when the detected high voltage exceeds a first reference voltage corresponding to a high voltage for generating more than a predetermined amount of X-rays, the X-ray protector comprising:

means for converting the detected high voltage applied to the cathode ray tube into digital detected high voltage data; and control means for storing a digital representation of the first reference voltage and a digital representation of a second reference voltage which is lower than the first reference voltage and higher than 0 V, for comparing the digital detected high voltage data with the digitally stored first reference voltage during normal operation and stopping the power supplied to the high voltage generator when the digital detected high voltage data is larger than the digitally stored first reference voltage and for comparing the digital detected high voltage data with the digitally stored second reference voltage during testing and stopping the power supplied to the high voltage generator when the digital detected high voltage data is larger than the digitally stored second reference voltage.

4. The X-ray protector according to claim 3 which further comprises remote control means for remotely switching between the first reference voltage and the second reference voltage.

5. The X-ray protector according to any one of claims 1 to 3 which further comprises:

storage means for storing a number of times the X-ray protector has been activated; and display means for displaying the stored number of times the X-ray protector has been activated on the cathode ray tube.

6. The X-ray protector according to any one of claims 1 to 3 which further comprises remote control means for regenerating a high voltage supplied to the cathode ray tube by the high voltage generator after the X-ray protector is tested.

7. The X-ray protector according to claim 3 which further comprises display means for indicating the presence of a circuit defect in the X-ray protector when the detected high voltage is lower than the second reference voltage at the time of testing the X-ray protector's operation.

8. The X-ray protector according to claim 1, further comprising:

first storing means for storing the first reference voltage;

second storing means for storing a second reference voltage which is lower than the first reference voltage and higher than 0 volts;

switching means for switching between the first and second reference voltages from the first and second storing means;

when said means for stopping power include comparing means for receiving the first reference voltage or the second reference voltage through the switching means and for comparing the first or second reference voltage with the detected high voltage; and switch control means for supplying to the comparing means the first reference voltage during normal operation and the second reference voltage during testing, wherein the comparing means outputs a signal for stopping power supply to the high voltage generator when the detected high voltage is larger than the first reference voltage during normal operation and outputs a signal for stopping the power supply to the high voltage generator when the detected voltage value is larger than the second reference voltage even if the detected voltage is not larger than the first reference voltage during testing.

9. The X-ray protector according to claim 2, further comprising:

first storing means for storing the first reference voltage;

second storing means for storing a second reference voltage which is lower than the first reference voltage and higher than 0 volts;

third storing means for storing a third reference voltage which is higher than the first reference voltage;

switching means for switching between the first, second or third reference voltages from the first, second and third storing means, respectively;

wherein the means for stopping power supplied to the high voltage generator and the means for inhibiting stoppage of power supplied to the high voltage generator include comparing means for receiving the first, second or third reference voltage through the switching means, receiving the detected high voltage and comparing the input reference voltage with the detected high voltage; and switch control means for supplying to the comparing means the first reference voltage during normal operation, the second reference voltage during testing, and the third reference voltage during channel switching or switching to external input reception, wherein the comparing means outputs a signal for stopping power supply to the high voltage generator when the detected voltage value is larger than the first reference voltage value during normal operation, a signal for stopping power supply to the high voltage generator when the detected voltage value is larger than the second reference voltage value even if it is not larger than the first reference voltage value, and a signal for stopping power supply to the high voltage generator when the detected voltage value is smaller than the third reference voltage value during channel switching or switching to external input reception.

10. The X-ray protector according to claim 3, wherein the control means further stores a digital representation of a third reference voltage which is higher than the first reference voltage, compares the digital high voltage data with the digitally stored third reference voltage, and does not stop power supply to the high voltage generator when the detected high voltage data is smaller than the digitally stored third reference voltage.

11. An apparatus comprising:

a power supply supplying a supply voltage to a high voltage generator;

a voltage detector, detecting a voltage related to a high voltage applied to a cathode ray tube by the high voltage generator and outputting a detected voltage value;

a comparator, comparing the detected voltage value with a first reference voltage value during normal operation and comparing the detected voltage value with a second reference voltage value during a testing operation; and a power supply controller shutting off said power supply when said comparator determines that the detected voltage value exceeds either the first or second reference voltage values to shut off the supply voltage to the high voltage generator wherein the first reference voltage value corresponds to a first high voltage value that generates a predetermined amount of X-rays when applied to the cathode ray tube by the high voltage generator wherein the second reference voltage value is less than the first reference voltage value.

12. The apparatus of claim 11, further comprising:

a first reference voltage memory storing the first reference voltage value, a second reference voltage memory storing the second reference voltage value, and a switch selecting either the first or the second reference voltage value from said first and second reference voltage memories and supplying the selected reference voltage value to said comparator.

13. The apparatus of claim 11, wherein said comparator compares the detected voltage value with a third reference voltage value during a channel switching operation, wherein said power supply controller shuts off said power supply when said comparator determines that the detected voltage value exceeds either the first, second or third reference voltage values wherein the third reference voltage value is greater than the first reference voltage value.

14. The apparatus of claim 13, further comprising:

a first reference voltage memory storing the first reference voltage value, a second reference voltage memory storing the second reference voltage value, a third reference voltage memory storing the third reference voltage value, and a switch selecting either the first, the second, or the third reference voltage value from said first, second and third reference voltage memories and supplying the selected reference voltage value to said comparator.

15. The apparatus of claim 13, further comprising a remote controller remotely controlling the channel switching operation wherein, upon channel switching, said comparator compares the detected voltage value with the third reference voltage value and said power supply controller shuts off said power supply when said comparator determines that the detected voltage value exceeds the third reference voltage value.

16. The apparatus of claim 11, further comprising a remote controller remotely controlling initiation of the testing operation such that said comparator compares the detected voltage value with the second reference voltage value and said power supply controller shuts off said power supply when said comparator determines that the detected voltage value exceeds the second reference voltage value.

17. The apparatus of claim 11, wherein said comparator compares the detected voltage value with a third reference voltage value during an external input switching operation, wherein said power supply controller shuts off said power supply when said comparator determines that the detected voltage value exceeds either the first, second or third reference voltage values wherein the third reference voltage value is greater than the first reference voltage value.

18. The apparatus of claim 17, further comprising:

a first reference voltage memory storing the first reference voltage value, a second reference voltage memory storing the second reference voltage value, a third reference voltage memory storing the third reference voltage value, and a switch selecting either the first, the second, or the third reference voltage value from said first, second and third reference voltage memories and supplying the selected reference voltage value to said comparator.

19. The apparatus of claim 17, further comprising a remote controller remotely controlling the external input switching operation wherein, upon switching the external input, said comparator compares the detected voltage value with the third reference voltage value and said power supply controller shuts off said power supply when said comparator determines that the detected voltage value exceeds the third reference voltage value.

20. The apparatus of claim 11, further comprising a counter counting each comparison by said comparator when the detected voltage value which exceeds the first or second reference voltage values.

21. The apparatus of claim 11, further comprising means for indicating that the apparatus is defective when, during the testing operation, said comparator determines that the detected voltage value fails to exceed the second reference voltage value.

22. A method for controlling a high voltage applied to a cathode ray tube by a high voltage generator comprising the steps of:

detecting a voltage related to the high voltage applied to the cathode ray tube by the high voltage generator and outputting a detected voltage value;

a first comparison step comparing the detected voltage value with a first reference voltage value during normal operation;

a second comparison step comparing the detected voltage value with a second reference voltage value during a testing operation; and shutting off a power supply to the high voltage generator when said first or second comparison steps determine that the detected voltage value exceeds either the first or second reference voltage values to shut off the high voltage applied to the cathode ray tube wherein the first reference voltage value corresponds to a first high voltage value that generates a predetermined amount of X-rays when applied to the cathode ray tube by the high voltage generator wherein the second reference voltage value is less than the first reference voltage value.

23. The method of claim 22, further comprising the steps of:

storing the first reference voltage value, and storing the second reference voltage value.

24. The method of claim 22, further comprising the step of:

a third comparison step comparing the detected voltage value with a third reference voltage value during a channel switching operation;

shutting off the power supply to the high voltage generator when said first, second or third comparison steps determine that the detected voltage value exceeds either the first, second or third reference voltage values, respectively wherein the third reference voltage value is greater than the first reference voltage value.

25. The method of claim 24, further comprising the step of:

storing the third reference voltage value.

26. The method of claim 24, further comprising the steps of:

remotely controlling the channel switching operation;

wherein, upon channel switching, said third comparison step compares the detected voltage value with the third reference voltage value, shutting off the power supply to the high voltage generator when said third comparison step determines that the detected voltage value exceeds the third reference voltage value.

27. The method of claim 22, further comprising the steps of:

remotely controlling initiation of the testing operation such that said second comparison step compares the detected voltage value with the second reference voltage value, and shutting off the power supply to the high voltage generator when said second comparison step determines that the detected voltage value exceeds the second reference voltage value.

28. The method of claim 22, further comprising the steps of:

a third comparison step comparing the detected voltage value with a third reference voltage value during an external input switching operation, shutting off the power supply to the high voltage generator when said comparison steps determine that the detected voltage value exceeds either the first, second or third reference voltage values wherein the third reference voltage value is greater than the first reference voltage value.

29. The method of claim 28, further comprising the steps of:

remotely controlling the external input switching operation wherein, upon switching the external input, said third comparison step compares the detected voltage value with the third reference voltage value, and shutting off the power supply to the high voltage generator when said third comparison step determines that the detected voltage value exceeds the third reference voltage value.

30. The method of claim 22, further comprising the step of:

counting each comparison by said first and second comparison steps when the detected voltage value which exceeds the first or second reference voltage values, respectively.

31. The method of claim 22, further comprising the step of:

indicating a defective condition when, during the testing operation, said second comparison step determines that the detected voltage value fails to exceed the second reference voltage value.

* * * * *